(12) United States Patent
Kahn et al.

(10) Patent No.: US 6,421,643 B1
(45) Date of Patent: Jul. 16, 2002

(54) METHOD AND APPARATUS FOR DIRECTING AN AUDIO FILE TO A SPEECH RECOGNITION PROGRAM THAT DOES NOT ACCEPT SUCH FILES

(75) Inventors: Jonathan Kahn, Crown Point, IN (US); Charles Qin, Lake Zurich, IL (US); Nicholas A. Linden, Cedar Lake, IN (US); James A. Sells, Corrales, NM (US)

(73) Assignee: Custom Speech USA, Inc., Crown Point, IN (US)

( * ) Notice: Subject to any disclaimer, the term of this patent is extended or adjusted under 35 U.S.C. 154(b) by 0 days.

(21) Appl. No.: 09/430,144

(22) Filed: Oct. 29, 1999

Related U.S. Application Data

(63) Continuation-in-part of application No. 09/362,255, filed on Jul. 28, 1999.

(51) Int. Cl.[7] .......................... G10L 21/06; G10L 11/02
(52) U.S. Cl. .................. 704/270; 704/270.1; 704/275; 704/278
(58) Field of Search ................................. 704/200, 270, 704/251–255, 231–243, 270.1, 278, 275; 345/709; 333/32

(56) References Cited

U.S. PATENT DOCUMENTS

| 5,251,283 A | * 10/1993 | Honis ........................ 704/200 |
| 5,517,572 A | * 5/1996 | Heyl ........................... 333/32 |
| 6,275,805 B1 | * 8/2001 | Fado et al. .................. 345/709 |

* cited by examiner

Primary Examiner—Richemond Dorvil
Assistant Examiner—Daniel Nolan
(74) Attorney, Agent, or Firm—Sonnenschein Nath & Rosenthal

(57) ABSTRACT

The present invention relates to a method and apparatus for directing a pre-recorded audio file to a speech recognition program that does not normally accept such files, such as IBM Corporation's Via Voice™ speech recognition program. The method includes: (a) launching the speech recognition program to accept speech as if the speech recognition program were receiving live audio from a microphone; (b) finding a mixer utility associated with the sound card; (c) opening the mixer utility, the mixer utility having settings that determine an input source and an output path; (d) changing the settings of the mixer utility to specify a line-in input source and a wave-out output path; (e) activating a microphone input of the speech recognition software; and (f) initiating a media player associated with the computer to play the pre-recorded audio file into the line-in input source. The method may additionally save and restore the original configuration settings of the mixer utility.

7 Claims, 3 Drawing Sheets

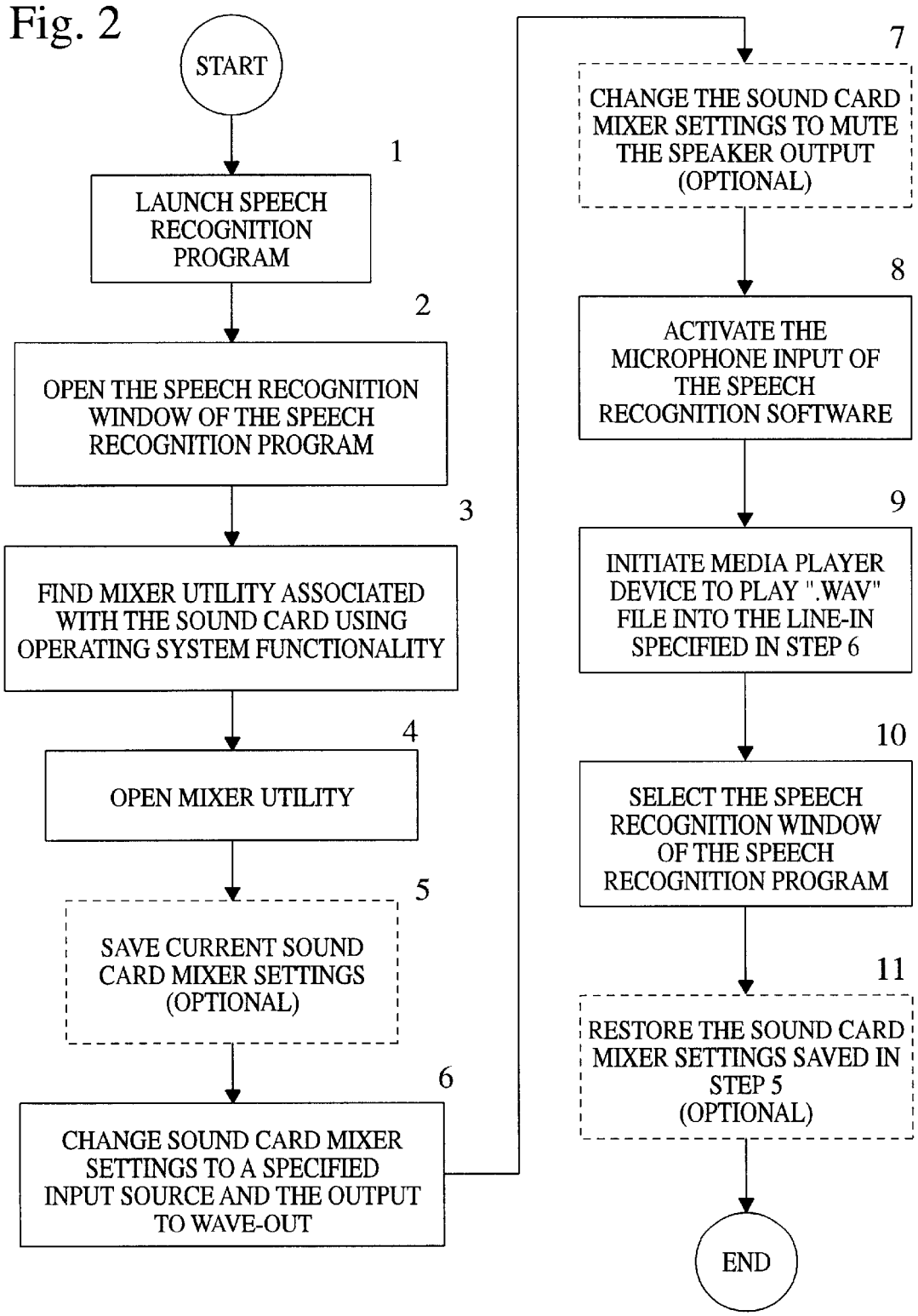

The Record control panel for SoundForge XP 4.0 showing the level meters

METHOD AND APPARATUS FOR DIRECTING AN AUDIO FILE TO A SPEECH RECOGNITION PROGRAM THAT DOES NOT ACCEPT SUCH FILES

RELATED APPLICATIONS

This application is a continuation-in-part of application Ser. No. 09/362,255 filed Jul. 28, 1999 by the assignee of the present invention.

BACKGROUND OF THE INVENTION

1. Field of the Invention

The present invention relates in general to speech recognition software and, in particular, to a method and apparatus for directing the output of a pre-recorded audio file into a speech recognition program.

2. Background Art

Speech recognition programs are well known in the art. While these programs are ultimately useful in automatically converting speech into text, many users are dissuaded from using these programs because they require each user to spend a significant amount of time training the system. Usually this training begins by having each user read a series of pre-selected materials for approximately 20 minutes. Then, as the user continues to use the program, as words are improperly transcribed the user is expected to stop and train the program as to the intended word thus advancing the ultimate accuracy of the speech file. Unfortunately, most professionals (doctors, dentists, veterinarians, lawyers) and business executive are unwilling to spend the time developing the necessary speech files to truly benefit from the automated transcription.

In a previously filed, co-pending patent application, the assignee of the present application teaches a system and method for quickly improving the accuracy of a speech recognition program. That system is based on a speech recognition program that automatically converts a pre-recorded audio file into a written text. That system parses the written text into segments, each of which is corrected by the system and saved in an individually retrievable manner in association with the computer. In that system, the speech recognition program saves the standard speech files to improve accuracy in speech-to-text conversion. That system further includes facilities to repetitively establish an independent instance of the written text from the pre-recorded audio file using the speech recognition program. That independent instance can then be broken into segments. Each segment in the independent instance is replaced with an individually retrievable saved corrected segment, which is associated with that segment. In that manner, applicant's prior application teaches a method and apparatus for repetitive instruction of a speech recognition program.

In another, previously filed, co-pending patent application, the assignee of the present application discloses a system for further automating transcription services in which a voice file is automatically converted into first and second written texts based on first and second set of speech recognition conversion variables, respectively. For instance, disclosed in this prior application is that the first and second sets of conversion variables have at least one difference, such as different speech recognition programs, different vocabularies, and the like.

As noted in this second co-pending patent application, certain speech recognition programs do not facilitate speech to text conversion of pre-recorded speech. One such program is the commercially successful ViaVoice™ product sold by IBM Corporation of Armonk, N.Y. Yet, the receipt of pre-recorded speech is integral to the automation of transcription services. Consequently, it is an object of the present invention to directing the output of a pre-recorded audio file into a speech recognition program that does not normally provide for such functionality.

This and other objects will be apparent to those of ordinary skill in the art having the present drawings, specification and claims before them.

SUMMARY OF THE DISCLOSURE

The present invention discloses, in part, a method for directing a pre-recorded audio file to a speech recognition program that does not normally accept such files, such as IBM Corporation's ViaVoice™ speech recognition software. The method includes: (a) launching the speech recognition program to accept speech as if the speech recognition program were receiving live audio from a microphone; (b) finding a mixer utility associated with the sound card; (c) opening the mixer utility, the mixer utility having settings that determine an input source and an output path; (d) changing the settings of the mixer utility to specify a line-in input source and a wave-out output path; (e) activating a microphone input of the speech recognition software; and (f) initiating a media player associated with the computer to play the pre-recorded audio file into the line-in input source.

In a preferred embodiment, the method may further include changing the mixer utility settings to mute audio output to speakers associated with the computer. Similarly, the method would preferably include saving the settings of the mixer utility before they are changed to reroute the audio stream and restoring the saved settings after the media player finishes playing the pre-recorded audio file.

The present invention also includes, in part, a system for directing a pre-recorded audio file to a speech recognition program that does not accept such files. The system includes a computer having a sound card with an associated mixer utility and an associated media player (capable of playing the pre-recorded audio file). The system further includes means for changing settings of the associated mixer utility, such that the mixer utility receives an audio stream from the media player and outputs a resulting audio stream to the speech recognition program as a microphone input stream.

In one preferred embodiment, the system further includes means for automatically opening the speech recognition program and activating the changing means. The system also preferably includes means for saving and restoring an original configuration of the mixer utility.

BRIEF DESCRIPTION OF THE DRAWINGS

FIG. 2 of the drawings is a flowchart showing the steps used in the present method and apparatus;

BEST MODES OF PRACTICING THE INVENTION

Figure 1:
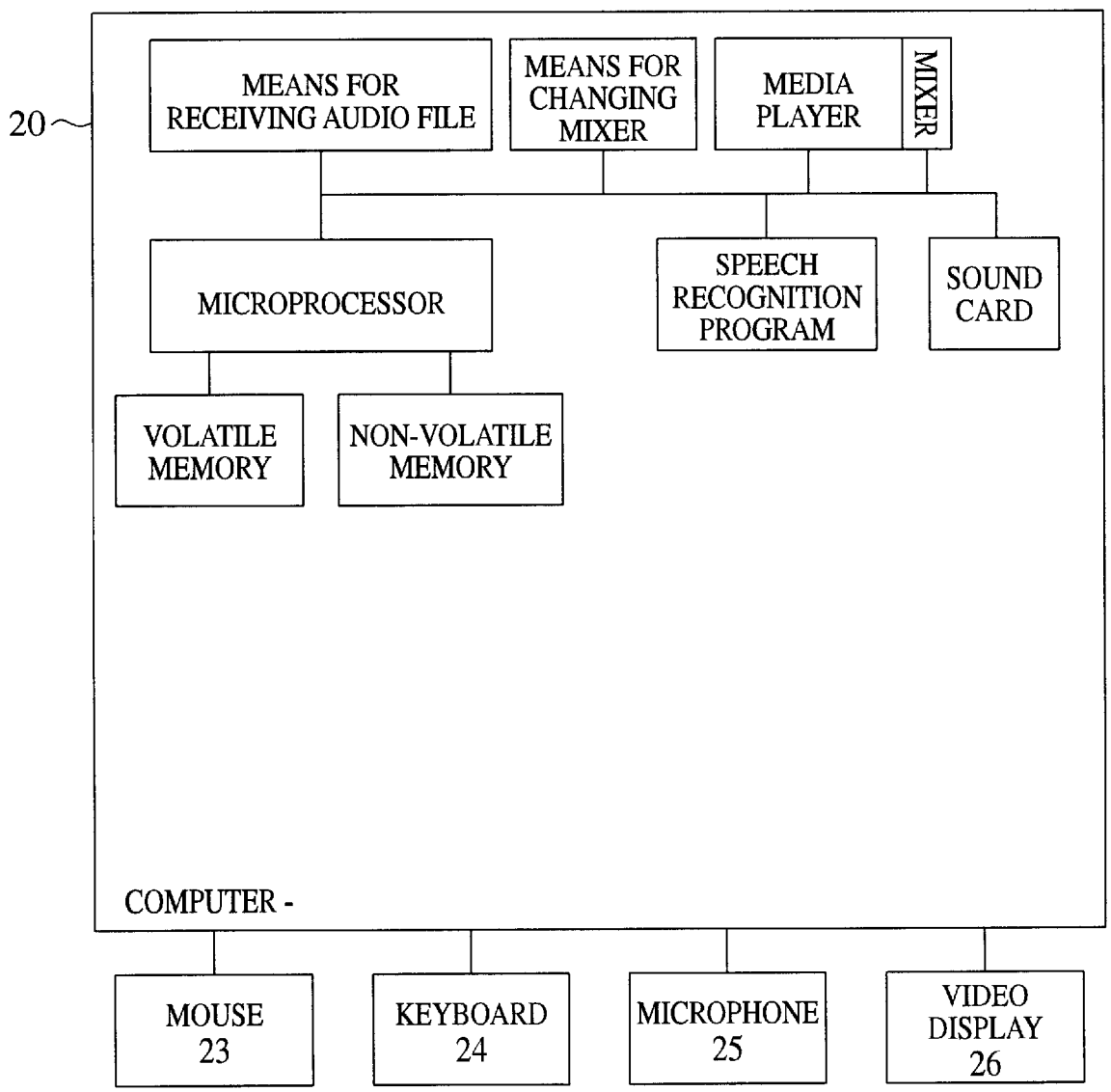
FIG. 1 of the drawings is a block diagram of one potential embodiment of the present system for substantially automating transcription services for one or more voice users.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

FIG. 1 of the drawings generally shows one potential embodiment of the present system for directing the output of a pre-recorded audio file into a speech recognition program. The system preferably includes a means for receiving a pre-recorded audio file. This audio file receiving means can be a digital audio recorder, an analog audio recorder, or standard means for receiving computer files on magnetic media or via a data connection; preferably implemented on a general-purpose computer (such as computer 20), although a specialized computer could be developed for this specific purpose.

Generally, this pre-recorded audio file can be thought of as a ".WAV" file. This ".WAV" file can be originally created by any number of sources, including digital audio recording software; as a byproduct of a speech recognition program; or from a digital audio recorder. Of course, as would be known to those skilled in the art, other audio file formats, such as MP2, MP3, RAW, CD, MOD, MIDI, AIFF, mu-law or DSS, could also be used to format the audio file, without departing from the spirit of the present invention. The method of saving such audio files is well known to those of ordinary skill in the art.

In some cases it may be necessary to pre-process the audio files to make them acceptable for processing by the speech recognition software. For instance, a DSS or RAW file format may selectively be changed to a WAV file format, or the sampling rate of a digital audio file may have to be upsampled or downsampled. Software to accomplish such pre-processing is available from a variety of sources including Syntrillium Corporation and Olympus Corporation.

The general-purpose computer should have, among other elements, a microprocessor (such as the Intel Corporation PENTIUM, AMD K6, Compaq Digital Alpha, or Motorola 68000 and Power PC series); volatile and non-volatile memory; one or more mass storage devices (i.e. HDD, floppy drive, and other removable media devices such as a CD-ROM drive, DITTO, ZIP or JAZ drive (from Iomega Corporation) and the like); various user input devices (input sources), such as a mouse 23, a keyboard 24, or a microphone 25; and a video display system 26. In one embodiment, the general-purpose computer is controlled by the WINDOWS 9.x operating system. It is contemplated, however, that the present system would work equally well using a MACINTOSH computer or even another operating system such as a WINDOWS CE, UNIX or a JAVA based operating system, to name a few.

As this system is for use in directing the output of a pre-recorded audio file into a speech recognition program that does not normally accept such files, the general purpose computer has amongst its programs at least one such speech recognition program, such as IBM's VIA VOICE. This system preferably includes a sound card (such as sound cards produced by Creative Labs, Trident, Diamond, Yamaha, Guillemot, NewCom, Inc., Digital Audio Labs, and Voyetra Turtle Beach, Inc.). The key to the present system and method is the configuration of the sound card to "trick" IBM Via Voice™ into thinking that it is receiving audio input (live audio) from a microphone or in-line when the audio is actually coming from a pre-recorded audio file. As an example, rerouting is achieved using a SoundBlaster Live™ sound card from Creative Labs of Milpitas, Calif.

Figure 3A:
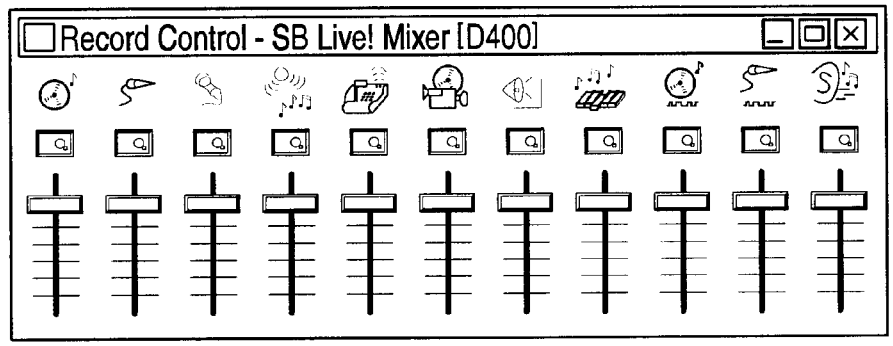
FIGS. 3A and 3B of the drawings depiction the graphical user interface of one particular sound card mixer utility that can be used within the present invention.
Figure 3B:
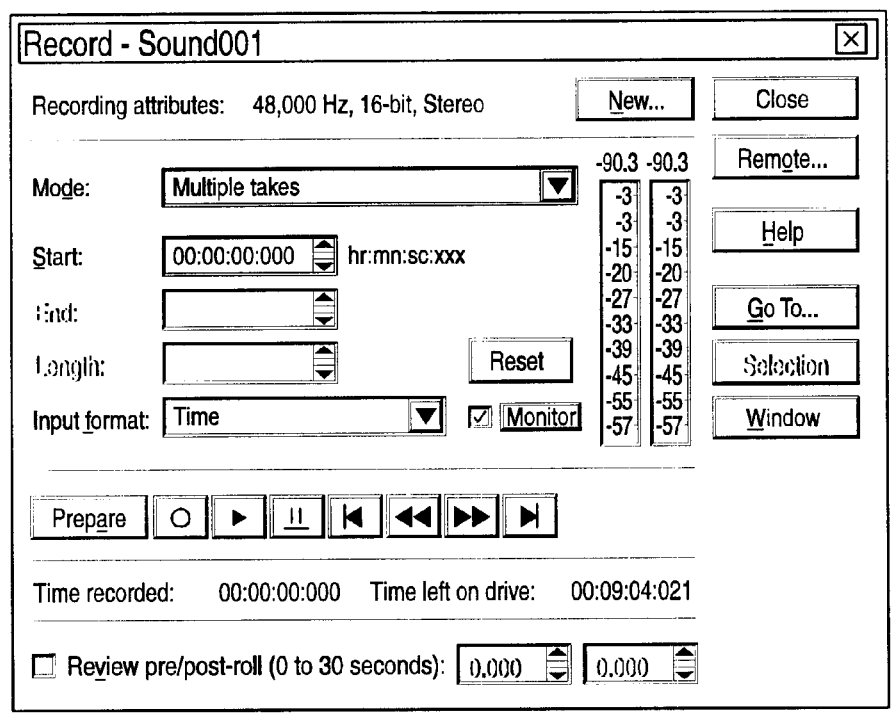

FIG. 2 is a flowchart showing the steps used in the present method and apparatus. In particular the following steps are used as an example implementation:

1. Speech recognition software is launched
2. The speech recognition window of the speech recognition software is opened in the same as if a live speaker were using the speech recognition software.
3. Find mixer utility associated with the sound card using operating system functionality.
4. Open mixer utility (see the depiction of one mixer's graphical user interface in FIG. 3A).
5. (Optional) Save current sound card mixer settings.
6. Change sound card mixer settings to a specified input source (i.e. "line-in") and the output path to wave-out (via "What U Hear" in the case of SoundBlaster Live™ card.)
7. (Optional) Change the sound card mixer setting to mute the speaker output.
8. Activate the microphone input of the speech recognition software.
9. Initiate media player device to play ".WAV" file into the line-in specified in step 6.
10. Open the speech recognition window such that the speech recognition program receive the redirected audio and transcribe the document.
11. (Optional) Restore the sound card mixer settings saved in step 5.

The foregoing steps are automated by running an executable simultaneously with the speech recognition software that feeds phantom keystrokes and mousing operations through the WIN32API, such that the speech recognition software believes that it is interacting with a human being, when in fact it is being controlled by the microprocessor. It is appreciated that these techniques are well known by those skilled in the computer software testing art. It should suffice to say that by watching the application flow of the foregoing steps, an executable to mimic the interactive manual steps can be created.

One example of code to effect the change of the mixer setting to redirect the audio where a card from Creative Labs in a WIN9x environment with IBM ViaVoice™ software is shown in Appendix A.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing for its spirit or essential characteristic. The described arrangements are illustrative and not restrictive. To those skilled in the art, the invention is susceptible to additional implementations or embodiments and certain of these details described in this application can be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A method for directing a pre-recorded audio file to a speech recognition program that does not accept such files, the speech recognition program being stored on a computer that has a sound card, said method comprising:

(a) launching the speech recognition program to accept speech as if the speech recognition program were receiving live audio from a microphone;
(b) finding a mixer utility associated with the sound card;
(c) opening the mixer utility, the mixer utility having settings that determine an input source and an output path;
(d) changing the settings of the mixer utility to specify a line-in input source and a wave-out output path;
(e) activating a microphone input of the speech recognition software; and
(f) initiating a media player associated with the computer to play the pre-recorded audio file into the line-in input source.

2. The invention according to claim 1 further including changing the mixer utility settings to mute audio output to speakers associated with the computer.

3. The invention according to claim 1 further including:
saving the settings of the mixer utility before changing the settings of the mixer utility to specify a line-in input source and a wave-out output path; and
restoring the saved sound card mixer settings after the media player finishes playing the pre-recorded audio file.

4. A system for directing a pre-recorded audio file to a speech recognition program that does not accept such files, said system comprising:
a computer having a sound card with an associated mixer utility, said computer executing said speech recognition program;
a media player operably associated with said computer, said media player capable of playing said pre-recorded audio file; and
means for changing settings of said associated mixer utility, such that said mixer utility receives an audio stream from said media player and outputs a resulting audio stream to said speech recognition program as a microphone input stream.

5. The invention according to claim 4 further including means for automatically opening said speech recognition program and activating said changing means.

6. The invention according to claim 5 further including means for saving and restoring an original configuration of said mixer utility.

7. The invention according to claim 4 further including means for saving and restoring an original configuration of said mixer utility.

* * * * *